United States Patent
Ogawa et al.

(10) Patent No.: US 6,884,498 B2
(45) Date of Patent: Apr. 26, 2005

(54) RUBBER BLANKET FOR OFFSET PRINTING

(75) Inventors: Yoshiharu Ogawa, Ibaraki (JP); Hiroshi Koriyama, Ibaraki (JP)

(73) Assignee: Kinyosha Co., Ltd., Tokyo (JP)

( * ) Notice: Subject to any disclaimer, the term of this patent is extended or adjusted under 35 U.S.C. 154(b) by 0 days.

(21) Appl. No.: 10/603,230

(22) Filed: Jun. 25, 2003

(65) Prior Publication Data

US 2004/0001935 A1 Jan. 1, 2004

Related U.S. Application Data

(63) Continuation of application No. PCT/JP01/11646, filed on Dec. 28, 2001.

(30) Foreign Application Priority Data

Sep. 6, 2002 (AR) .................................. P02 01 03368

(51) Int. Cl.[7] ................................................ B32B 7/02
(52) U.S. Cl. ...................... 428/216; 428/214; 428/909
(58) Field of Search .............................. 428/214, 216, 428/909; 101/376

(56) References Cited

U.S. PATENT DOCUMENTS 5,364,683 A 11/1994 Flint et al.

FOREIGN PATENT DOCUMENTS

| JP | 63-868 | 1/1988 |
|---|---|---|
| JP | 6-219078 | 8/1994 |
| JP | 7-505341 | 6/1995 |
| JP | 10-272860 | 10/1998 |
| JP | 43444 | 2/2000 |
| JP | 2000-71415 | 3/2000 |
| JP | 2000-238457 | 9/2000 |
| JP | 343852 | 12/2000 |
| JP | 2001-171256 | 6/2001 |
| WO | WO 91/04157 | 4/1991 |

OTHER PUBLICATIONS

English–language translation of International Search Report dated Mar. 19, 2002 in connection with International Application No. PCT/JP01/11646.

Japanese–language International Preliminary Examination Report and English–language translation thereof, dated Aug. 13, 2003, in connection with International Application No. PCT/JP01/11646.

Japanese–language Written Opinion and English–language translation thereof, dated Feb. 25, 2003, in connection with International Application No. PCT/JP01/11646.

Primary Examiner—Alexander S. Thomas
(74) Attorney, Agent, or Firm—John P. White; Cooper & Dunham LLP

(57) ABSTRACT

The present invention provides a rubber blanket for an offset printing, comprising a surface rubber layer, a first fabric layer, a compressible layer and a second fabric layer, wherein the thickness of the blanket falls within a range of between 1.65 mm and 3 mm, the first fabric layer is a plain weave having a thickness falling within a range of between 0.2 mm and 0.35 mm, the second fabric layer is a plain weave having a thickness falling within a range of between 0.35 mm and 0.55 mm, a tensile strength not lower than 50 kgf/cm, and an elongation at break not higher than 7.5%, and the compressible layer has a thickness falling within a range of between 0.5 mm and 2.15 mm.

8 Claims, 2 Drawing Sheets

RUBBER BLANKET FOR OFFSET PRINTING

CROSS-REFERENCE TO RELATED APPLICATIONS

This is a Continuation Application of PCT Application No. PCT/JP01/11646, filed Dec. 28, 2001, which was not published under PCT Article 21(2) in English.

BACKGROUND OF THE INVENTION

1. Field of the Invention

The present invention relates to a rubber blanket for an offset printing.

2. Description of the Related Art

A rubber blanket for an offset printing plays the role of receiving an ink from a printing plate and transferring the received ink onto a paper sheet or the like. A rubber blanket constructed as shown in, for example, FIG. 4 is known to the art. As shown in the drawing, the rubber blanket for an offset printing comprises a surface rubber layer 11 for receiving and transferring an ink. Laminated on the lower surface of the surface rubber layer 11 are a solid rubber layer $14_1$, a fabric layer $12_1$, a solid rubber layer $14_2$, a compressible layer 13, a solid rubber layer $14_3$, a fabric layer $12_2$, a solid rubber layer $14_4$, a fabric layer $12_3$, a solid rubber layer $14_5$, and a fabric layer $12_4$ in the order mentioned.

The compressible layer 13, which permits improving the absorption of the shock and reproducibility of the printing plate, is formed of, for example, a porous rubber. Each of the four fabric layers $12_1$ to $12_4$ is formed of, for example, a natural fiber such as cotton or a woven fabric such as a synthetic fiber. On the other hand, each of the solid rubber layers $14_1$ and $14_2$ performs the function of an adhesive agent for bonding the adjacent fabric layers to each other.

It is necessary for the rubber blanket for printing, which is mounted to a blanket cylinder made of a metal with a predetermined tension, to have a suitable elongation rate and a sufficient mechanical strength. Therefore, it is considered desirable for the rubber blanket for printing to include a large number of fabric layers.

Disclosed in U.S. Pat. No. 5,364,683 is a blanket for printing comprising a first compressible fabric layer prepared by coating the upper surface of a woven fabric with a binder material containing a plurality of cells so as to impart a compressibility to said woven fabric, an intermediate compressible layer laminated on the first compressible fabric layer, a first adhesive layer laminated on the intermediate compressible layer, a second compressible fabric layer laminated on the first adhesive layer and prepared by allowing a woven fabric to be impregnated a binder material containing a plurality of cells, a second adhesive layer laminated on the second compressible fabric layer, and a third compressible fabric layer laminated on the second adhesive layer and prepared by allowing the lower surface region of a woven fabric to be impregnated with a binder material containing a plurality of cells.

However, each of the rubber blanket for an offset printing, which is constructed as shown in FIG. 4, and the blanket for printing disclosed in U.S. Pat. No. 5,364,683 gives rise to problems (1) to (3) given below:

(1) The fabric layer is formed mainly of a woven fabric and, thus, tends to tinked down or packed down so as to be permanently deformed, if pressure is applied thereto. Therefore, if the blanket includes many fabric layers, e.g., 3 to 4 fabric layers, generated is the problem called tinking down or packing down, i.e., the problem that the thickness of the entire blanket is decreased by the pressure repeatedly applied to the blanket during the printing operation. The problem of tinking down or packing down tends to be generated particularly in the case of using a cotton cloth for forming the fabric layer. If the thickness of the blanket is decreased, the smash thickness is lowered so as to lower the degree of the ink transfer, with the result that generated is a defective printing such as failure to obtain a required ink concentration. In such a case, required in many cases is a so-called "cylinder arrangement", i.e., the operation to dispose an underlay below the blanket so as to restore the thickness of the blanket and, thus, to acquire the normal smash thickness, with the result that the rate of operation of the printing apparatus is lowered.

(2) If printing is performed on a large number of paper sheets having a small width by using a blanket including many fabric layers, i.e., 3 to 4 fabric layers, tinking down or packing down (permanent deformation) is generated in that portion of the blanket which corresponds to the printing paper sheets having a small width. If printing is performed subsequently on a paper sheet having a large width, the printing concentration is lowered in the tinking down or packing down portion of the blanket. In an extreme case, a clear difference in the printing concentration is brought about between the portion of the printed paper sheet corresponding to the portion of the blanket where the tinking down or packing down is generated and the portion of the printed paper sheet corresponding to the portion of the blanket where the tinking down and packing down is not generated, making it unavoidable to discard the printed paper sheet as a defective printed material.

(3) If a paper sheet is broken during the printing operation so as to cause many pieces of the broken paper sheet to be wound around the cylinder of the blanket, the blanket partially receives an excessively high pressure so as to bear a recess. In the worst case, the blanket is bruised. As a result, the recessed or bruised portion of the blanket is rendered substantially incapable of receiving the ink from the printing plate. In this case, the printing cannot be performed so as to make it necessary to replace the blanket. Also, if the defective blanket noted above is applied to an old machine or a high speed machine, an axial streak called shock-streak tends to be reproduced on the printed matter.

BRIEF SUMMARY OF THE INVENTION

An object of the present invention is to provide a rubber blanket for an offset printing capable of suppressing the decrease in the thickness caused by the permanent deformation derived from the repetition of the printing operation and exhibiting an improved restoring properties in the event of receipt of a shock such as an excessively high pressure.

According to the present invention, there is provided a rubber blanket for an offset printing, comprising a surface rubber layer; a first fabric layer bonded to the lower surface of the surface rubber layer; a compressible layer bonded to the lower surface of the first fabric layer; and a second fabric layer bonded to the lower surface of the compressible layer; wherein the thickness of the blanket falls within a range of between 1.65 mm and 3 mm; the first fabric layer is a plain weave having a thickness falling within a range of between 0.2 mm and 0.35 mm; the second fabric layer is a plain weave having a thickness falling within a range of between 0.35 mm and 0.55 mm, a tensile strength not lower than 50 kgf/cm, and an elongation at break not higher than 7.5%; and the compressible layer has a thickness falling within a range of between 0.5 mm and 2.15 mm.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
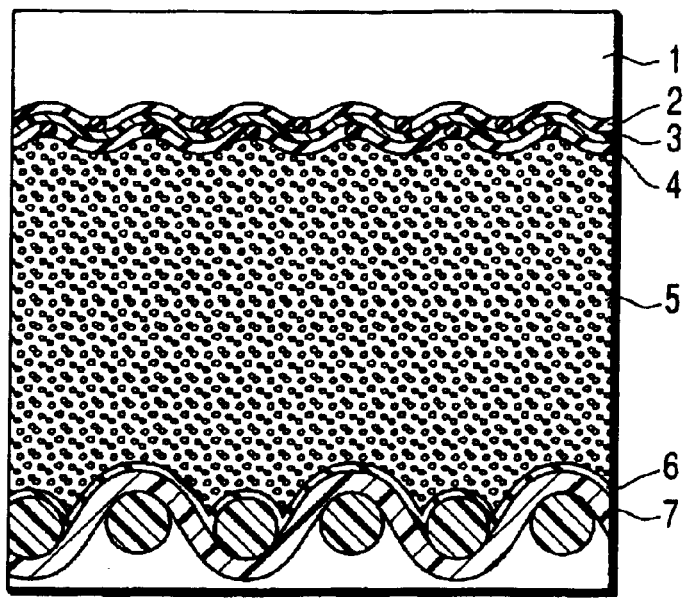
FIG. 1 schematically shows as an example the construction of a rubber blanket for an offset printing according to the present invention.

As a result of an extensive research, the present inventors have found that the decrease in the restoring speed of the blanket (decrease in the shock absorbing properties) in the event of receipt of a shock such as an excessively high pressure and the tinking down or packing down of the blanket generated when pressure is repeatedly applied to the blanket by the printing operation are caused solely by the fabric layer such as a cotton cloth and the solid rubber layer (adhesive layer). Also, as a result of the repetition in the trial manufacture of the blanket for printing, the present inventors have found that, in order to improve the shock absorbing properties of the blanket and to decrease the amount of the tinking down and packing down, it is effective to remove the solid rubber layer used for bonding the adjacent layers to each other and to decrease the number of fabric layers to two layers so as to arrive at completion of the present invention.

According to the present invention, there is provided a rubber blanket for an offset printing, comprising a surface rubber layer; a first fabric layer bonded to the lower surface of the surface rubber layer; a compressible layer bonded to the lower surface of the first fabric layer; and a second fabric layer bonded to the lower surface of the compressible layer; wherein the thickness of the blanket falls within a range of between 1.65 mm and 3 mm; the first fabric layer has a thickness falling within a range of between 0.2 mm and 0.35 mm; the second fabric layer has a thickness falling within a range of between 0.35 mm and 0.55 mm, a tensile strength not lower than 50 kgf/cm, and an elongation at break not higher than 7.5%; and the compressible layer has a thickness falling within a range of between 0.5 mm and 2.15 mm.

It is more desirable for the thickness of the blanket to fall within a range of between 1.65 mm and 2.2 mm.

According to the rubber blanket of the construction described above, it is possible to improve the restoring speed when the breakage of the paper sheet causes an excessively high pressure to be applied to the blanket because the ratio in the thickness of the compressible layer occupied in the thickness of the blanket is large.

It should also be noted that the rubber blanket of the present invention includes only two fabric layers. In addition, the thickness of each of the two fabric layers is defined in the present invention as pointed out above. It follows that it is possible to decrease the ratio in the thickness of the fabric layers occupied in the thickness of the blanket so as to decrease the amount of permanent deformation generated when pressure is repeatedly applied by the printing operation and to decrease the amount of the tinking down and packing down.

Further, since the blanket includes only two fabric layers, it is also possible to decrease the number of adhesive layers used so as to improve the shock absorbing properties.

What should also be noted is that, since the tensile strength and the elongation at break of the second fabric layer are defined as pointed out above, it is possible to ensure a sufficient mechanical strength of the rubber blanket.

It follows that the present invention makes it possible to improve the shock absorbing properties and, at the same time, to decrease the amount of the tinking down and packing down without impairing the mechanical strength required for the rubber blanket.

The compressible layer, the first and second fabric layers, the surface rubber layer, and the first to third adhesive layers included in the rubber blanket of the present invention will now be described in detail.

1) Compressible layer:

It is desirable for the compressible layer to contain as a main component a porous and oil-resistant rubber matrix. The oil-resistant rubber matrix can be obtained by the vulcanization. Where the printing is performed by using an ink prepared by using a nonpolar solvent, it is possible for the rubber material to be provided by polar polymers such as acrylonitrile-butadiene rubber (NBR), chloroprene rubber (CR), fluorine-contained rubber (FKM), and polyurethane rubber (UR). On the other hand, where the printing is performed by using an ink prepared by using a polar solvent, it is possible for the rubber material to be provided by nonpolar polymers such as ethylene-propylene rubber (EPDM) and butyl rubber (IIR). It is possible for the rubber composition to contain additives, as required, in addition to the rubber material. The additives used in the present invention include, for example, a vulcanizing agent, vulcanization accelerators such as D.M (dibenzothiazole, disfide) and M (2-mercapto benzothiazole), an antioxidant, a reinforcing agent, a filler, and a plasticizer.

The oil-resistant rubber matrix can be made porous by, for example, the addition of microcapsules, the method using an impregnated paper, a salt leaching method, and the method using foaming agent.

It is desirable for the compressible layer to have a thickness falling within a range of between 0.5 mm and 2.15 mm. If the thickness of the compressible layer is smaller than 0.5 mm, it is difficult to suppress the tinking down and packing down of the blanket. On the other hand, if the thickness of the compressible layer exceeds 2.15 mm, it is impossible to ensure sufficient thicknesses of the other layers such as the surface rubber layer and the first and second fabric layers. It is more desirable for the compressible layer to have a thickness falling within a range of between 0.5 mm and 1.1 mm.

2) First and Second Fabric Layers:

It is possible for each of the first and second fabric layers to be formed of, for example, a woven fabric or a unwoven fabric. Also, it is possible to use a natural fiber such as a cotton fiber and a synthetic fiber such as polyvinyl alcohol for forming each of the first and second fabric layers. It is possible for the first and second fabric layers to be formed of the same material or different materials.

It is desirable for the second fabric layer to have a tensile strength not lower than 50 kgf/cm and an elongation at break not higher than 7.5%. It should be noted in this connection that the blanket is mounted to the blanket cylinder during the printing operation and, thus, a predetermined tension is kept applied to the blanket during the printing operation. If the second fabric layer has a tensile strength lower than 50 kgf/cm in the case where the first and second fabric layers constitute all the fabric layers included in the blanket, the blanket tends to be broken by the tension applied to the blanket during the printing operation. It is more desirable for the second fabric layer to have a tensile strength not lower than 55 kgf/cm.

On the other hand, if the second fabric layer has an elongation at break exceeding 7.5%, the blanket tends to be elongated during the printing operation so as to bring about a printing disorder. It is more desirable for the second fabric layer to have an elongation at break not higher than 6.5%.

It is desirable for the first fabric layer to have a thickness falling within a range of between 0.2 mm and 0.35 mm, and for the second fabric layer to have a thickness falling within a range of between 0.35 mm and 0.55 mm. It follows that it is desirable for the sum in the thickness of all the fabric layers included in the blanket to fall within a range of between 0.55 mm and 0.9 mm. If the first and second fabric layers are constructed to have the thickness defined above, it is possible to suppress the tinking down and packing down of the blanket, and to avoid formation of the irregularity corresponding to the texture of the first fabric layer on the surface of the surface rubber layer. At the same time, it is possible to improve the tensile strength of the blanket. It is more desirable for the first fabric layer to have a thickness falling within a range of between 0.2 mm and 0.3 mm. On the other hand, it is more desirable for the second fabric layer to have a thickness falling within a range of between 0.35 mm and 0.45 mm.

3) Surface Rubber Layer

The surface rubber layer serves to receive an ink. It is possible to prepare the surface rubber layer by vulcanizing a rubber composition sheet. The rubber material contained in the rubber composition includes, for example, an acrylonitrile-butadiene rubber.

It is desirable for the surface rubber layer to have a thickness falling within a range of between 0.25 mm and 0.8 mm. If the thickness of the surface rubber layer is smaller than 0.25 mm, an irregularity corresponding to the texture of the first fabric layer tends to be formed on the surface of the surface rubber layer so as to make it possible for the texture of the first fabric layer to be reproduced on the printed matter, thereby making the printed matter defective. On the other hand, if the thickness of the surface rubber layer is larger than 0.8 mm, the blanket is deformed by the pressure applied to the blanket during the printing operation, with the result that it is possible to bring about the problem that the paper feeding speed is rendered higher than the design value.

4) First to Third Adhesive Layers:

It is desirable for the rubber blanket of the present invention to comprise a first adhesive layer which bonds the surface rubber layer to the first fabric layer, a second adhesive layer which bonds the first fabric layer to the compressible layer, and a third adhesive layer which bonds the compressible layer to the second fabric layer.

Each of the first to third adhesive layers contains as a main component an oil-resistant rubber matrix. The rubber materials equal to those described previously in conjunction with the compressible layer can be used for forming the oil-resistant rubber matrix.

It is desirable for the sum in the thickness of the first to third adhesive layers to be not larger than 0.1 mm. If the sum in the thickness noted above exceeds 0.1 mm, it is difficult to improve the restoring force of the blanket when a shock such as an excessively high pressure is applied to the blanket.

It is desirable for the rubber blanket for an offset printing according to the present invention to satisfy formulas (1) and (2) given below:

$$B \leq A \leq C \tag{1}$$

$$B \leq D \leq C \tag{2}$$

where "A" represents the thickness (mm) of the surface rubber layer, "B" represents the thickness (mm) of the first fabric layer, "C" represents the thickness (mm) of the compressible layer, and "D" represents the thickness (mm) of the second fabric layer.

As given in formula (1), the thickness B of the first fabric layer is set equal to or smaller than the thickness A of the surface rubber layer in the present invention. If the thickness B of the first rubber layer is larger than the thickness of the surface rubber layer, an irregularity corresponding to the texture of the first fabric layer tends to be formed on the surface of the surface rubber layer, with the result that it is possible for the texture of the first fabric layer to be reproduced on the printed matter so as to render the printed matter defective.

The thickness A of the surface rubber layer is not larger than the thickness C of the compressible layer, as defined in formula (1) given above. If the thickness A is larger than the thickness C, the compressibility of the blanket tends to be lowered so as to make it impossible to improve the shock absorbing properties of the blanket.

It is possible to further improve the tensile strength of the blanket by setting the thickness B of the first fabric layer at a level not larger than the thickness D of the second fabric layer, as defined in formula (2) given above.

Further, if the thickness D of the second fabric layer is larger than the thickness C of the compressible layer, the compressibility of the blanket is lowered so as to make it impossible to improve the shock absorbing properties of the blanket. Naturally, it is necessary for the thickness D of the second fabric layer to be not larger than the thickness C of the compressible layer.

It follows that, if formulas (1) and (2) given above are satisfied, it is possible to further improve the tensile strength and the shock absorbing properties of the blanket while avoiding the reproduction of the texture of the first fabric layer on the printed matter.

FIG. 1 shows as an example the construction of a rubber blanket for an offset printing according to the present invention. As shown in the drawing, the rubber blanket for an offset printing specified in the present invention consists essentially of a laminate structure prepared by laminating a surface rubber layer 1, a first adhesive layer 2, a first fabric layer 3, a second adhesive layer 4, a compressible layer 5, a third adhesive layer 6, and a second fabric layer 7 in the order mentioned.

Some Examples of the present invention will now be described with reference to the accompanying drawings.

EXAMPLE 1
<Preparation of Rubber Paste for Compressible Layer>

Rubber paste A was prepared by adding sulfur, a vulcanization accelerator M (2-methyl mercapto benzothiazole), an antioxidant, a reinforcing agent and a plasticizer to 100 parts by weight of a medium high acrylonitrile-butadiene rubber (NBR), followed by dissolving the resultant mixture in methyl ethyl ketone.

Then, rubber paste B was prepared by adding 10 parts by weight of Exbancell 092DE (trade name of microcapsules produced by Novel Industries Inc., made of methacrylonitrile-acrylonitrile copolymer and having an average particle diameter of 80 $\mu$m) to rubber paste A referred to above.
<Lamination-Bonding Process>

Prepared as the first fabric layer 3 was a woven fabric of Cralon k-II (trade name of a Vinylon fiber manufactured by Toko Kosen K.K.) having a thickness of 0.25 mm.

On the other hand, prepared as the second fabric layer 7 was a cotton woven fabric manufactured by Toko Kosen K.K., and having a thickness of 0.5 mm, a tensile strength of 60 kg/cm, and an elongation at break of 6.5%.

The tensile strength and the elongation at break were measured as follows:

Measuring Machine: TENSILON (ORIENTEC CRTC-1250A);

Measuring Condition: The test piece had a width of 20 mm and a length of 200 mm (between the chucks);

Measuring Method: The pulling speed was set at 50 mm/min.

One surface of the first fabric layer 3 was coated with the rubber paste A in a thickness of 0.02 mm so as to form an unvulcanized second adhesive layer 4, followed by further coating the unvulcanized second adhesive layer 4 with the rubber paste B in a thickness of 0.76 mm so as to form an unvulcanized compressible layer 5. Then, the second fabric layer 7 having an unvulcanized third adhesive layer 6 formed thereon in advance by the coating of the rubber paste A in a thickness of 0.002 mm was attached to the unvulcanized compressible layer 5 formed of the coated rubber paste B.

In the next step, the surface of the first fabric layer 3 was coated with the rubber paste A in a thickness of 0.02 mm so as to form an unvulcanized first adhesive layer 2, followed by laminating a sheet of an acrylonitrile-butadiene rubber composition having a thickness of 0.53 mm, said sheet being used as an unvulcanized surface rubber layer 1, on the unvulcanized first adhesive layer 2 so as to obtain an unvulcanized compressible rubber blanket (blanket precursor) having a thickness of about 2.1 mm.
<Vulcanizing Process>

The unvulcanized compressible blanket was heated at 150° C. for 6 hours so as to finish the vulcanizing treatment.

Figure 2:
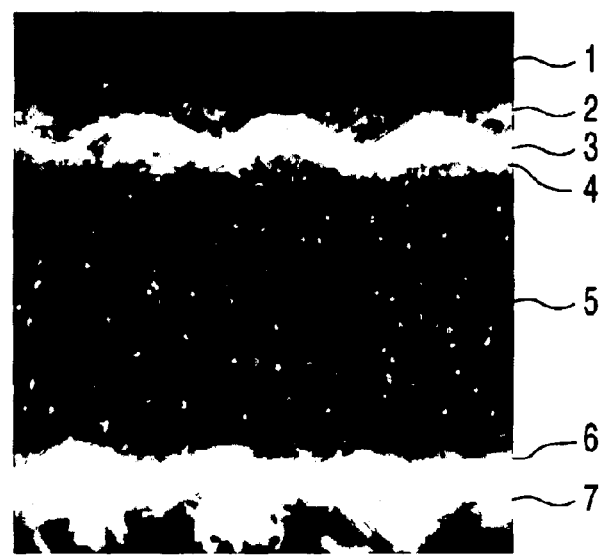
FIG. 2 is a scanning electron micrograph (magnification of 26) showing a cross section of a rubber blanket for an offset printing for Example 1 of the present invention.

Then, the vulcanized rubber blanket thus prepared was cooled, followed by polishing the surface rubber layer with a sand paper having 320 mesh so as to obtain a rubber blanket for an offset printing constructed as shown in FIG. 1 and having a thickness of 1.95 mm. FIG. 2 is a scanning electron micrograph (magnification of 26) showing an optional cross section of the rubber blanket thus prepared.

Concerning the rubber blanket thus prepared, measured were the thickness A (mm) of the surface rubber layer, the thickness B (mm) of the first fabric layer, the thickness C (mm) of the compressible layer, the thickness D (mm) of the second fabric layer, the total thickness E (mm) of the first to third adhesive layers, the total thickness (A+B+C+D+E) (mm) of the rubber blanket, the tensile strength (kgf/cm) of the second fabric layer, and the elongation at break (%) of the second fabric layer. Table 1 shows the results. Table 1 also shows whether the rubber blanket satisfied the conditions of $B \leq A \leq C$ and $B \leq D \leq C$.

EXAMPLES 2 TO 4

A rubber blanket for an offset printing was prepared as in Example 1, except that the thickness A (mm) of the surface rubber layer, the thickness B (mm) of the first fabric layer, the thickness C (mm) of the compressible layer, the thickness D (mm) of the second fabric layer, the thickness E (mm) of the sum of the first to third adhesive layers, the total thickness (A+B+C+D+E) (mm) of the rubber blanket, the tensile strength (kgf/cm) of the second fabric layer, and the elongation at break (%) of the second fabric layer were set as shown in Tables 1 and 2.

COMPARATIVE EXAMPLE 1

Rubber paste A for the adhesive layer and rubber paste B for the compressible layer were prepared as in Example 1.
<Lamination-Bonding Process>

A first cotton cloth having a thickness of 0.2 mm was prepared as the fabric layer. Also prepared were second to fourth cotton cloths each having a thickness of 0.35 mm, a tensile strength of 30 kgf/cm, and an elongation at break of 6.5%. After an unvulcanized adhesive layer 14$_2$ was formed by coating one surface of a first fabric layer 12$_1$ with the rubber paste A in a thickness of 0.02 mm, the unvulcanized adhesive layer 14$_2$ was coated with the rubber paste B so as to form an unvulcanized compressible layer 13 in a thickness of 0.26 mm. Then, a second fabric layer 12$_2$ having an unvulcanized adhesive layer 14$_3$ formed thereon in advance by the coating of the rubber paste A in a thickness of 0.02 mm was attached to the unvulcanized compressible layer 13 formed by the coating of the rubber paste B.

Then, the other surface of the second fabric layer 12$_2$ was coated with the rubber paste A in a thickness of 0.05 mm so as to form an unvulcanized adhesive layer 14$_4$, followed by attaching a third fabric layer 12$_3$ to the unvulcanized adhesive layer 14$_4$. Further, the surface of the third fabric layer 12$_3$ was coated with the rubber paste A in a thickness of 0.05 mm so as to form an unvulcanized adhesive layer 14$_5$, followed by attaching a fourth fabric layer 12$_4$ to the unvulcanized adhesive layer 14$_5$.

Finally, the surface of the first fabric layer 12$_1$ was coated with the rubber paste A in a thickness of 0.02 mm so as to form an unvulcanized adhesive layer 14$_1$, followed by laminating a sheet of an acrylonitrile-butadiene rubber composition having a thickness of 0.45 mm and acting as an unvulcanized surface rubber layer 11 on the unvulcanized adhesive layer 14$_1$ so as to obtain an unvulcanized compressible rubber blanket (blanket precursor) having a thickness of about 2.1 mm.
<Vulcanizing Process>

The unvulcanized compressible rubber blanket thus obtained was heated at 150° C. for 6 hours so as to finish the vulcanizing treatment.

Figure 4:
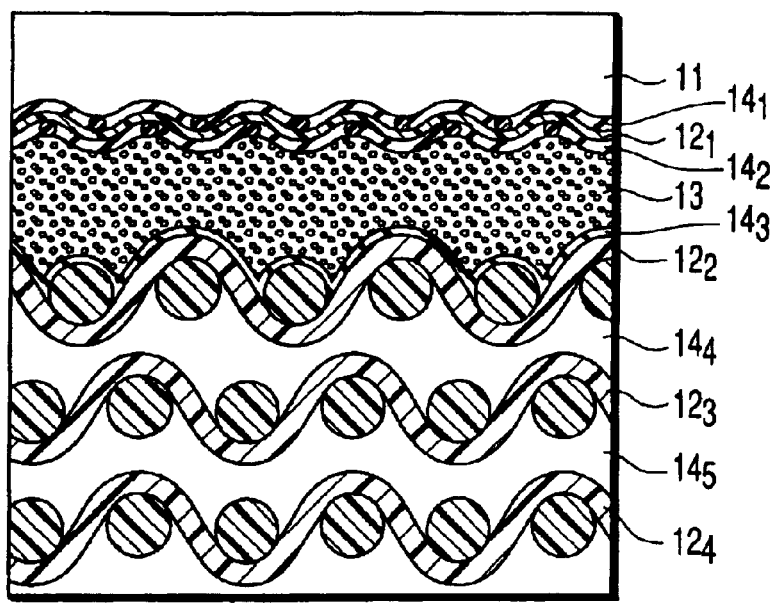
FIG. 4 schematically shows as an example the construction of the conventional rubber blanket for an offset printing.
Figure 3:
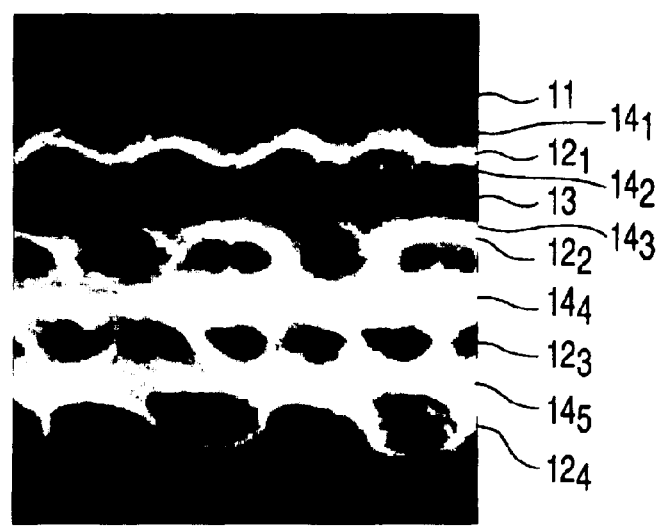
FIG. 3 is a scanning electron micrograph (magnification of 26) showing a cross section of a rubber blanket for an offset printing for Comparative Example 1.

The vulcanized rubber blanket was cooled and, then, the surface rubber layer of the vulcanized rubber blanket was polished with a sand paper having 320 mesh so as to obtain a rubber blanket for an offset printing constructed as shown in FIG. 4 and having a thickness of 1.9 mm. FIG. 3 is a scanning electron micrograph (magnification of 26) showing an optional cross section of the rubber blanket thus obtained.

COMPARATIVE EXAMPLE 2

Rubber paste A for the adhesive layer and rubber paste B for the compressible layer were prepared as in Example 1.

<Lamination-Bonding Process>

A first cotton cloth having a thickness of 0.2 mm was prepared as the fabric layer. Also prepared were second and third cotton cloths each having a thickness of 0.35 mm, a tensile strength of 30 kgf/cm, and an elongation at break of 6.5%. After an unvulcanized adhesive layer was formed by coating one surface of a first fabric layer with the rubber paste A in a thickness of 0.02 mm, the unvulcanized adhesive layer thus formed was coated with the rubber paste B so as to form an unvulcanized compressible layer in a thickness of 0.26 mm. Then, a second fabric layer having an unvulcanized adhesive layer formed thereon in advance by the coating of the rubber paste A in a thickness of 0.02 mm was attached to the unvulcanized compressible layer formed by the coating of the rubber paste B.

Then, the other surface of the second fabric layer was coated with the rubber paste A in a thickness of 0.05 mm so as to form an unvulcanized adhesive layer, followed by attaching a third fabric layer to the unvulcanized adhesive layer thus formed.

Finally, the surface of the first fabric layer was coated with the rubber paste A in a thickness of 0.02 mm so as to form an unvulcanized adhesive layer, followed by laminating a sheet of an acrylonitrile-butadiene rubber composition having a thickness of 0.23 mm and acting as an unvulcanized surface rubber layer on the unvulcanized adhesive layer so as to obtain an unvulcanized compressible rubber blanket (blanket precursor) having a thickness of about 2.1 mm.

<Vulcanizing Process>

The unvulcanized compressible rubber blanket thus obtained was heated at 150° C. for 6 hours so as to finish the vulcanizing treatment.

The vulcanized rubber blanket was cooled and, then, the surface rubber layer of the vulcanized rubber blanket was polished with a sand paper having 320 mesh so as to obtain a rubber blanket for an offset printing having a thickness of 1.95 mm.

COMPARATIVE EXAMPLES 3 AND 4

A rubber blanket for an offset printing was prepared as in Example 1, except that the thickness A (mm) of the surface rubber layer, the thickness B (mm) of the first fabric layer, the thickness C (mm) of the compressible layer, the thickness D (mm) of the second fabric layer, the thickness E (mm) of the sum of the first to third adhesive layers, the total thickness (A+B+C+D+E) (mm) of the rubber blanket, the tensile strength (kgf/cm) of the second fabric layer, and the elongation at break (%) of the second fabric layer were set as shown in Tables 1 and 2.

Tests 1) to 3) given below were applied to each of the rubber blankets for an offset printing prepared in Examples 1 to 4 and Comparative Examples 1 to 4. Table 2 shows the results.

1) Test for Evaluating Shock Absorbing Properties:

Printing was performed by mounting a rubber blanket for an offset printing to a one-by-one type offset printer. The printing was performed under the condition that the smash thickness between the printing plate and the blanket was set at 0.12 mm.

In the first step, a test paper sheet was prepared by partially attaching a paper sheet having a thickness of 0.4 mm to a printing paper sheet (coated paper) having a thickness of 0.1 mm so as to enable to press a part of the blanket strongly. The test paper sheet was passed through the printer, followed by performing the normal printing operation so as to look into the number of printed paper sheets required for allowing the trace of the recess to disappear. Table 2 shows the result.

2) Measurement of the Collapsing Amount:

A rubber blanket for an offset printing was mounted to a newspaper offset rotary press, and the rotary press was rotated 5,000,000 times for the printing at a rotating speed of 450 rotations per minute, with the smash thickness between the printing plate and the blanket set at 0.15 mm, followed by examining the amount of change in the tinking down and packing down with a blanket cylinder gage. Table 2 shows the result.

3) Evaluation of Collapsing by Printing Test with Change in Paper Width:

Each blanket was used for the printing on a thick paper sheet having a thickness of 0.45 mm. In the first step, the printing was performed on 100,000 paper sheets each having a width of 600 mm and, then, the printing was performed on paper sheets each having a width of 900 mm so as to examine whether there would be an abnormality during the printing operation. Table 2 shows the result.

TABLE 1

|  | Surface rubber layer thickness A (mm) | First fabric layer thickness B (mm) | Compressible layer thickness C (mm) | Second fabric layer thickness D (mm) | Third fabric layer thickness X (mm) |
| --- | --- | --- | --- | --- | --- |
| Example 1 | 0.38 | 0.25 | 0.76 | 0.5 | — |
| Example 2 | 0.38 | 0.25 | 0.51 | 0.45 | — |
| Example 3 | 0.38 | 0.20 | 0.66 | 0.35 | — |
| Example 4 | 0.38 | 0.34 | 0.82 | 0.55 | — |
| Comparative Example 1 | 0.28 | 0.2 | 0.26 | 0.35 | 0.35 |
| Comparative Example 2 | 0.23 | 0.2 | 0.26 | 0.35 | 0.35 |

TABLE 1-continued

| | | | | | |
|---|---|---|---|---|---|
| Comparative Example 3 | 0.38 | 0.5 | 0.76 | 0.25 | — |
| Comparative Example 4 | 0.38 | 0.25 | 0.76 | 0.5 | — |

| | Fourth fabric layer thickness Y (mm) | Adhesive layer total thickness E (mm) | Blanket total thickness (mm) | $B \leq A \leq C$ | $B \leq D \leq C$ |
|---|---|---|---|---|---|
| Example 1 | — | 0.06 | 1.95 | B < A < C | B < D < C |
| Example 2 | — | 0.06 | 1.65 | B < A < C | B < D < C |
| Example 3 | — | 0.06 | 1.65 | B < A < C | B < D < C |
| Example 4 | — | 0.06 | 2.15 | B < A < C | B < D < C |
| Comparative Example 1 | 0.35 | 0.16 | 1.95 | Four fabric layers | |
| Comparative Example 2 | — | 0.11 | 1.95 | Three fabric layers | |
| Comparative Example 3 | — | 0.06 | 1.95 | X | X |
| Comparative Example 4 | — | 0.06 | 1.95 | B < A < C | B < D < C |

TABLE 2

| | Tensile strength of second fabric (kgf/cm) | Elongation at break of second fabric (%) | The number of printed paper sheets until disappearance of trace of recess | Collapsing amount after 5,000,000 rotations for printing (mm) | Printing test with change in width of paper sheet |
|---|---|---|---|---|---|
| Example 1 | 60 | 6.5 | 3 | 0.03 | No abnormality |
| Example 2 | 60 | 6.5 | 4 | 0.03 | No abnormality |
| Example 3 | 50 | 6.5 | 3 | 0.01 | No abnormality |
| Example 4 | 65 | 6 | 2 | 0.05 | No abnormality |
| Comparative Example 1 | 30 | 6.5 | No disappearance even after printing on 150 paper sheets | 0.09 | Replacement of blanket |
| Comparative Example 2 | 30 | 6.5 | No disappearance even after printing on 98 paper sheets | 0.08 | Replacement of blanket |
| Comparative Example 3 | 40 | 10 | Occurrence of texture on printed surface | | |
| Comparative Example 4 | 40 | 12 | Since blanket was elongated, the tension was decreased so as to give rise to loosening | | |

As apparent from Tables 1 and 2, the blanket for each of Examples 1 to 4 was satisfactory in test 1) for evaluating the shock absorbing properties. Specifically, it was possible to eliminate completely the recess generated by partially pressurizing the blanket after the printing on three paper sheets. On the other hand, the trace of the recess was recognized on the printed paper sheet even after the printing on 150 paper sheets when it comes to the blanket for each of Comparative Examples 1 and 2.

Concerning test 2) for evaluating the tinking down and packing down amount, the blanket for each of Examples 1 to 4 of the present invention was capable of suppressing the tinking down and packing down amount after 5,000,000 rotations for printing, compared with the blanket for each of Comparative Examples 1 and 2.

Further, concerning the printing test 3) with change in the width of the paper sheet, no abnormality was recognized in performing the printing on the paper sheet having a width of 900 mm when it comes to the blanket for each of Examples 1 to 4 of the present invention. On the other hand, the printed paper sheet having a width of 900 mm was caused to bear the trace of the paper sheet having a width of 600 mm, when it comes to the blanket for each of Comparative Examples 1 and 2, with the result that it was unavoidable to replace the blanket.

On the other hand, the printed paper sheet was caused to bear the texture of the first fabric layer in the case of the blanket for Comparative Example 3. Also, in the case of the blanket for Comparative Example 4, the blanket was elongated, with the result that the tension was decreased so as to give rise to the loosening between the blanket and the printing cylinder.

As described above in detail, the present invention provides a rubber blanket for an offset printing capable of suppressing the reduction in thickness derived from the permanent deformation caused by the repeated printing operation and also capable of improving the restoring properties when a shock such as an excessively high pressure is applied to the blanket.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A rubber blanket for an offset printing, comprising:

a surface rubber layer;

a first fabric layer bonded to the lower surface of said surface rubber layer;

a compressible layer bonded to the lower surface of said first fabric layer; and a second fabric layer bonded to the lower surface of said compressible layer;

wherein:

the thickness of the blanket falls within a range of between 1.65 mm and 3 mm;

said first fabric layer is a plain weave having a thickness falling within a range of between 0.2 mm and 0.35 mm;

said second fabric layer is a plain weave having a thickness falling within a range of between 0.35 mm and 0.55 mm, a tensile strength not lower than 50 kgf/cm, and an elongation at break not higher than 7.5%; and said compressible layer has a thickness falling within a range of between 0.5 mm and 2.15 mm.

2. The rubber blanket for an offset printing according to claim 1, which satisfies formulas (1) and (2) given below:

$$B \leq A \leq C \quad (1)$$

$$B \leq D \leq C \quad (2)$$

where "A" represents the thickness (mm) of said surface rubber layer, "B" represents the thickness (mm) of said first fabric layer, "C" represents the thickness (mm) of said compressible layer, and "D" represents the thickness (mm) of said second fabric layer.

3. The rubber blanket for an offset printing according to claim 1, wherein the thickness of said surface rubber layer falls within a range of between 0.25 mm and 0.8 mm.

4. The rubber blanket for an offset printing according to claim 1, wherein the thickness of said compressible layer falls within a range of between 0.5 mm and 1.1 mm.

5. The rubber blanket for an offset printing according to claim 1, wherein the thickness of said first fabric layer falls within a range of between 0.2 mm and 0.3 mm and the thickness of said second fabric layer falls within a range of between 0.35 mm and 0.45 mm.

6. The rubber blanket for an offset printing according to claim 1, wherein the tensile strength of said second fabric layer is not lower than 55 kgf/cm.

7. The rubber blanket for an offset printing according to claim 1, wherein the elongation at break of said second fabric layer is not higher than 6.5%.

8. The rubber blanket for an offset printing according to claim 1, further comprising: a first adhesive layer provided between said surface rubber layer and said first fabric layer; a second adhesive layer provided between said first fabric layer and said compressible layer; and a third adhesive layer provided between said compressible layer and said second fabric layer, wherein a total thickness of said first to third adhesive layers falls within a range of not more than 0.1 mm.

* * * * *